United States Patent [19]
Tanahashi

[11] Patent Number: 5,414,333
[45] Date of Patent: May 9, 1995

[54] SPEED CONTROL APPARATUS FOR ELEVATORS USING VARIABLE VOLTAGE AND VARIABLE FREQUENCY CONTROL

[75] Inventor: Toru Tanahashi, Gifu, Japan

[73] Assignee: Mitsubishi Denki Kabushiki Kaisha, Tokyo, Japan

[21] Appl. No.: 304,208

[22] Filed: Sep. 12, 1994

Related U.S. Application Data

[63] Continuation of Ser. No. 666,220, Mar. 7, 1991, abandoned.

[30] Foreign Application Priority Data

Mar. 8, 1990 [JP] Japan .................................. 2-55087

[51] Int. Cl.$^6$ .............................................. H02F 7/00
[52] U.S. Cl. .................................... 318/268; 318/800; 187/296
[58] Field of Search ........................ 318/798–812, 318/268, 270, 276, 59, 61; 187/100, 112, 116, 119, 28, 29.1, 38, 39; 338/811

[56] References Cited

U.S. PATENT DOCUMENTS

| | | | |
|---|---|---|---|
| 2,705,286 | 12/1972 | Kondo et al. | 219/69.13 |
| 4,071,729 | 1/1975 | Bell, Jr. | 291/69.13 |
| 4,128,771 | 12/1978 | Domenico | 323/283 |
| 4,320,279 | 3/1982 | Bell, Jr. et al. | 219/69.18 |
| 4,335,436 | 6/1982 | Inoue | 219/69.13 |
| 4,356,542 | 10/1982 | Bruckner et al. | 323/283 |
| 4,357,516 | 11/1982 | Inoue | 219/69.17 |
| 4,361,745 | 11/1982 | Rupert et al. | 219/69.13 |
| 4,370,536 | 1/1983 | Kruth | 219/69.18 |
| 4,392,043 | 7/1983 | Inoue | 219/69.18 |
| 4,504,722 | 3/1985 | Kishi et al. | 219/69.18 |
| 4,617,675 | 10/1986 | Ashikaga | 398/811 |
| 4,623,042 | 11/1986 | Kamaike | 187/119 |
| 4,625,834 | 12/1986 | Tanahashi | 187/29 |
| 4,671,389 | 6/1987 | Tanahashi | 187/119 |
| 4,673,791 | 6/1987 | Konno et al. | 219/69.13 |
| 4,681,191 | 7/1987 | Ikejima | 187/119 |
| 4,780,658 | 10/1988 | Koyama | 318/808 |
| 4,792,741 | 12/1988 | Matsuo et al. | 318/800 |
| 4,800,248 | 1/1989 | Futamura et al. | 219/69.18 |
| 4,814,683 | 3/1989 | Okamoto et al. | 318/800 |
| 4,851,982 | 7/1989 | Tanahashi | 363/37 |
| 4,920,246 | 4/1990 | Aoki | 323/283 |
| 5,149,940 | 9/1992 | Davis et al. | 219/130.21 |
| 5,182,474 | 1/1993 | Kaneko | 219/69.18 |
| 5,233,158 | 8/1993 | Karakama et al. | 219/130.33 |
| 5,254,937 | 10/1993 | Mizoguchi | 323/283 |

FOREIGN PATENT DOCUMENTS

| | | | |
|---|---|---|---|
| 57-89522 | 6/1982 | Japan | 219/69.13 |
| 59-169717 | 9/1984 | Japan . | |
| 61-30334 | 2/1986 | Japan | 219/69.13 |
| 63-68318 | 3/1988 | Japan | 219/69.18 |
| 63-180416 | 7/1988 | Japan | 219/69.18 |
| 2166269 | 4/1986 | United Kingdom . | |

OTHER PUBLICATIONS

Translation of Japan, Kokai, 59–169,717 by Otagaki et al., PTO 94-2634.

*Primary Examiner*—Jonathan Wysocki
*Attorney, Agent, or Firm*—Leydig, Voit & Mayer

[57] ABSTRACT

A speed control apparatus for an elevator using V.V.V.F. control including a power conversion device, an induction motor and a control device. The control device detects a secondary magnetic flux value from an output current of the power conversion device and generates a control command value for smooth operation of the elevator based on the velocity of the motor and the secondary magnetic flux value.

6 Claims, 6 Drawing Sheets

FIG.5(a) OUTPUT OF CONNECTOR

FIG.5(b) SECONDARY MAGNETIC FLUX ($\Phi_2$) MAGNETIC FLUX COMPONENT CURRENT COMMAND VALUE $i_d^*$

FIG.5(c) OUTPUT OF CONNECTOR

FIG.5(d) SECONDARY MAGNETIC FLUX ($\Phi_2$) MAGNETIC FLUX COMPONENT CURRENT COMMAND VALUE

SPEED CONTROL APPARATUS FOR ELEVATORS USING VARIABLE VOLTAGE AND VARIABLE FREQUENCY CONTROL

This application is a continuation of application Ser. No. 07/666,220, filed Mar. 7, 1991.

TECHNICAL FIELD

This invention relates to a speed control apparatus for elevators.

BACKGROUND OF THE INVENTION

Heretofore, known speed control apparatus for elevators which utilize an induction motor for driving a cage commonly employ variable voltage and variable frequency speed control of the induction motor (hereinbelow, termed "V.V.V.F. control"). In this apparatus slip frequency control is used as a basis for the V.V.V.F. control of the induction motor. However, such apparatus has been known to have problems in operating an elevator smoothly without causing sudden abrupt movements during the elevator starting operation.

SUMMARY OF THE INVENTION

The principal object of this invention is to overcome the above mentioned problems of the prior art and to provide a speed control apparatus which is capable of reducing sudden abrupt movements during the elevator starting operation.

Figure 6:
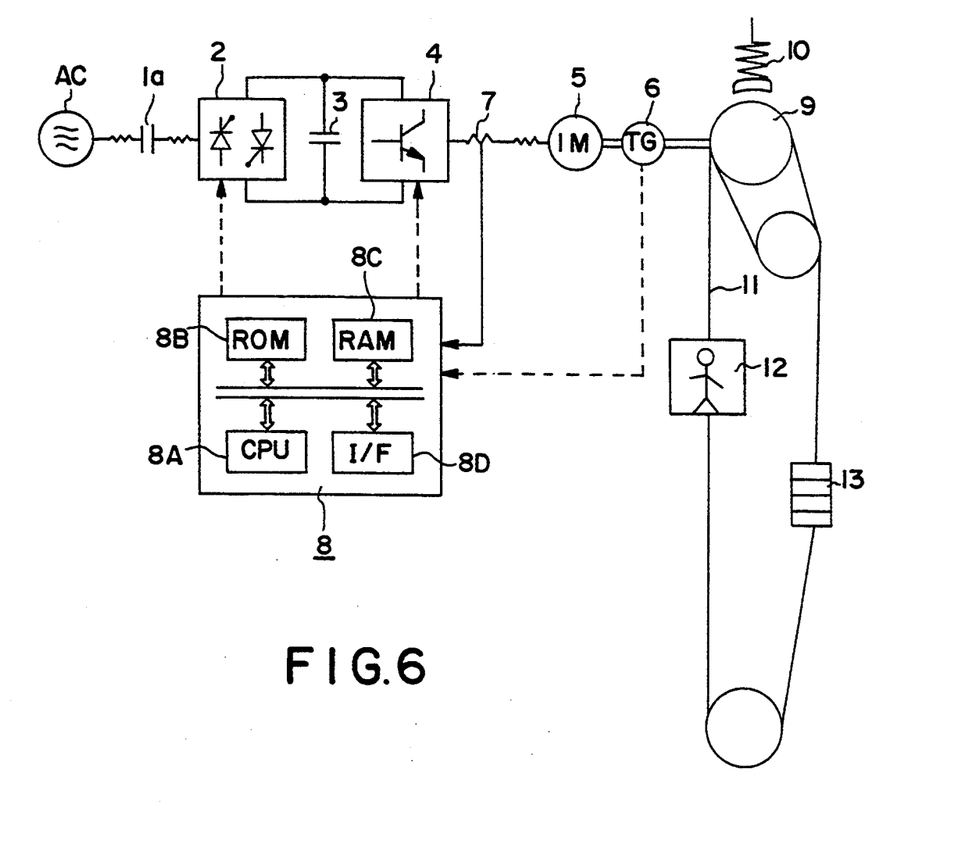
FIG. 6 is a block diagram showing the arrangement of a conventional speed control apparatus for an elevator along with a system for balancing a cage.
Figure 7:
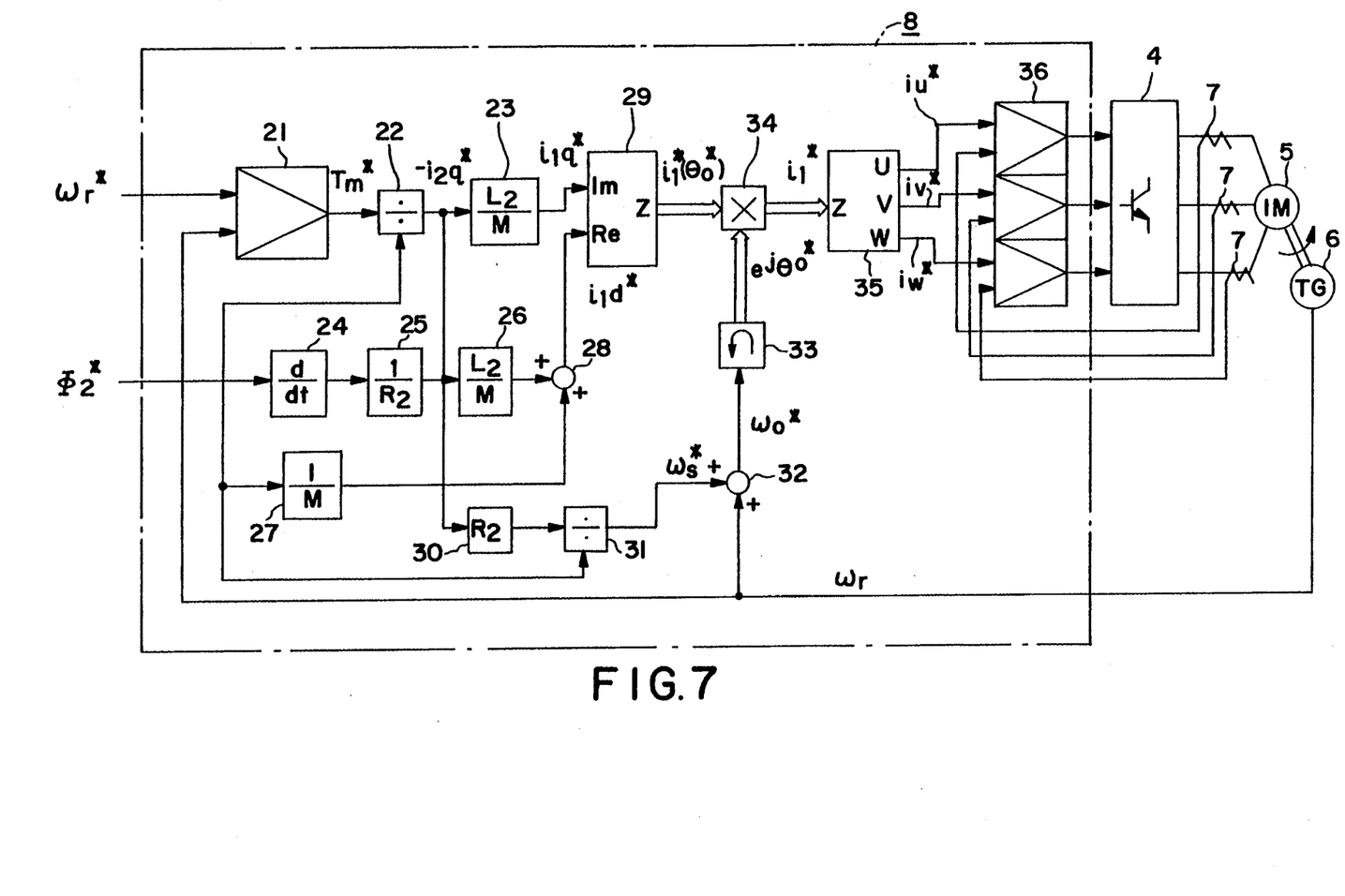
FIG. 7 is a block diagram showing the arrangement of a prior-art voltage/frequency control device which constitutes the control apparatus.

Turning first to the prior system illustrated in FIG. 6 and 7, this speed control apparatus for elevators is described in Japanese Publication No. 16184/85 and U.S. Pat. No. 4,567,419. In this apparatus, a three phase A.C. power source AC is connected to a thyristor converter 2 through a closed connector 1a when the elevator is started. Then, alternating current is converted to direct current by the thyristor converter 2 and direct current is converted to variable voltage and variable frequency alternating current by a thyristor invertor 4. Such alternating current is supplied by an induction motor 5 which moves cage 12.

In this case, the control device 8 has an interface (I/F), a read only memory (ROM), a random access memory (RAM) and a microprocessor (CPU). It receives and stores control command values including the signals of velocity sensors (tachometer generator) 6, and subjects the power conversion device to pulse width modulation (PWM) control on the basis of the stored data. Thus, the A.C. voltage of an approximate sinusoidal wave having any desired voltage value and frequency value is applied to the induction motor 9.

With such control apparatus, when the ratio between the voltage and the frequency is maintained in a predetermined relationship, the output torque of the induction motor 5 can be kept constant. However, when it is intended to attain a control performance equivalent to that of a D.C. motor, both vector and phase control of the induction motor is required.

FIG. 7 shows an example of an arrangement of the control device which is called the "slip frequency type vector control system". Although the actual vector control system is performed by the use of a microcomputer, the device is illustrated as a block here in order to facilitate understanding of the principle.

The slip frequency vector control system evaluates a magnetic flux component current and a torque component current as values on secondary magnetic flux coordinates. When changed into primary current values on fixed coordinates, they are changed without detecting a secondary magnetic flux vector.

In this case, a slip frequency which is determined by the magnetic flux component current and the torque component current is calculated using motor constants. This slip frequency and a rotational velocity are subsequently added to find the rotational velocity of the secondary magnetic flux. This rotational velocity is integrated to obtain a position, which is used for the coordinate transformation as the estimated position of the secondary magnetic flux.

Thus, the control device is supplied with a motor velocity signal as the state variable of the induction motor for addition with the slip frequency, but it is not supplied with any signal concerning the secondary magnetic flux. The magnetic flux control does not perform the feedback control either, and a first-order lead is directly calculated and obtained from a secondary magnetic flux command so as to compensate for the first-order lag response of the secondary magnetic flux to the magnetic flux component current.

Accordingly, the slip frequency vector control is a kind of predictive control which performs the control while estimating the magnetic flux vector by the calculations.

However, in the example of the above-described prior art, a shock is generated upon elevator restarting due to over excitation because a value of the calculated secondary magnetic flux is different from a value of the real secondary magnetic flux. That is, though the value of the calculated secondary magnetic flux is zero upon elevator restarting, the real secondary magnetic flux may not be zero because of slow attenuation of the real secondary magnetic flux when the elevator restarts after a short rest period.

DESCRIPTION OF BEST MODE

Figure 1:
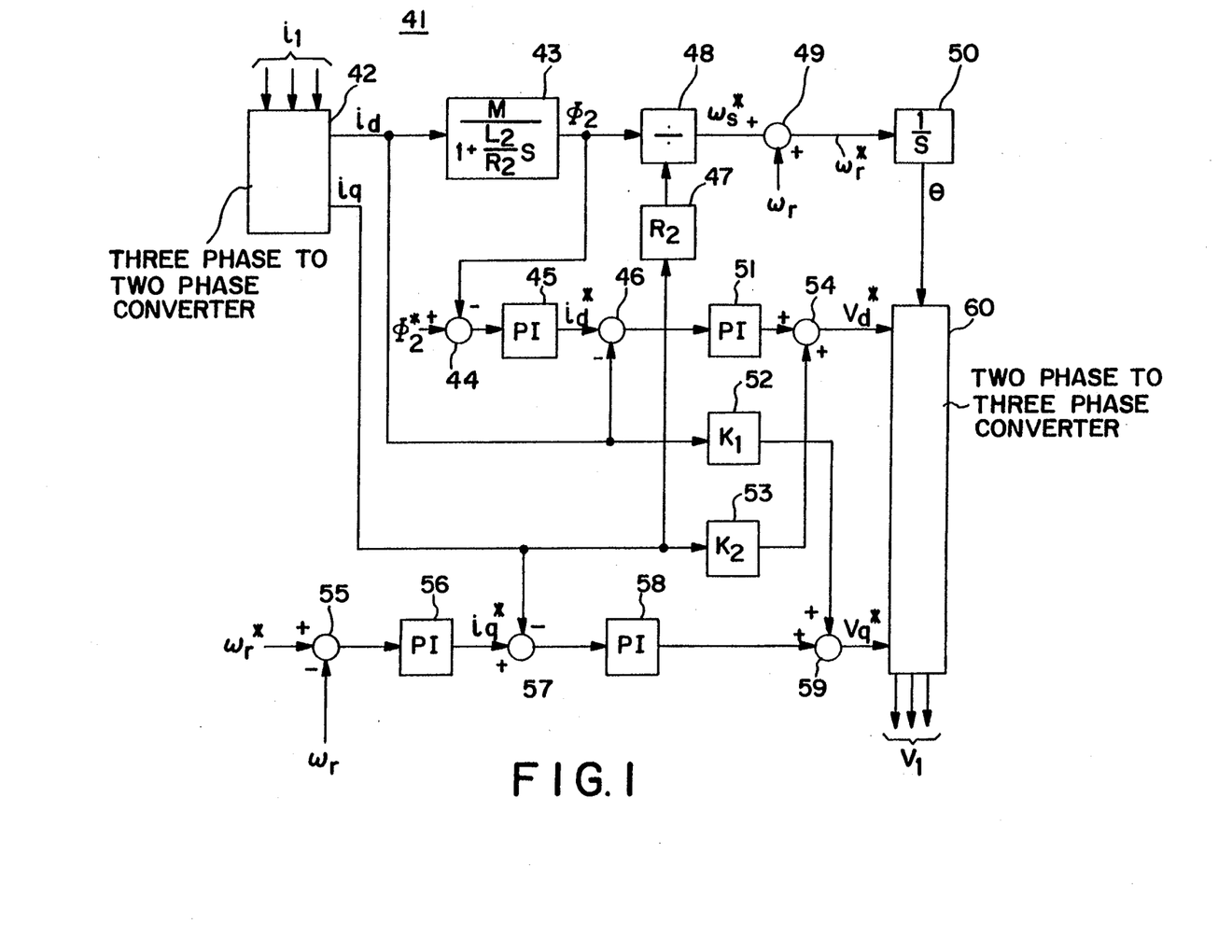
FIG. 1 is a block diagram of the control apparatus according to the present invention.
Figure 2:
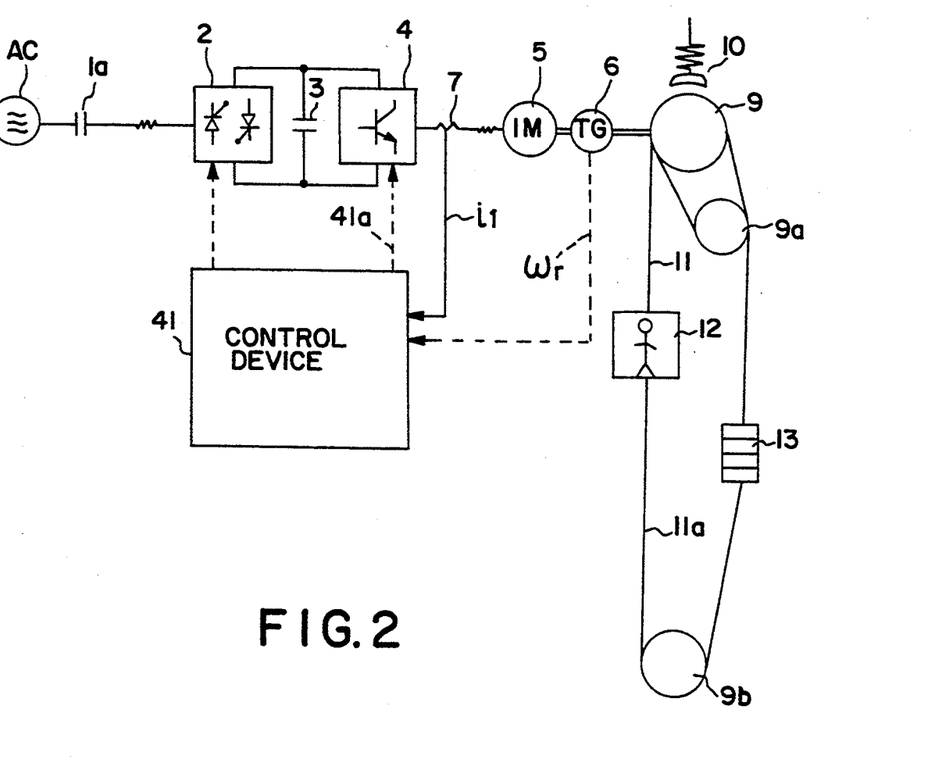
FIG. 2 is a block diagram showing an arrangement of a conventional speed control apparatus for an elevator according to the present invention.
Figure 3:
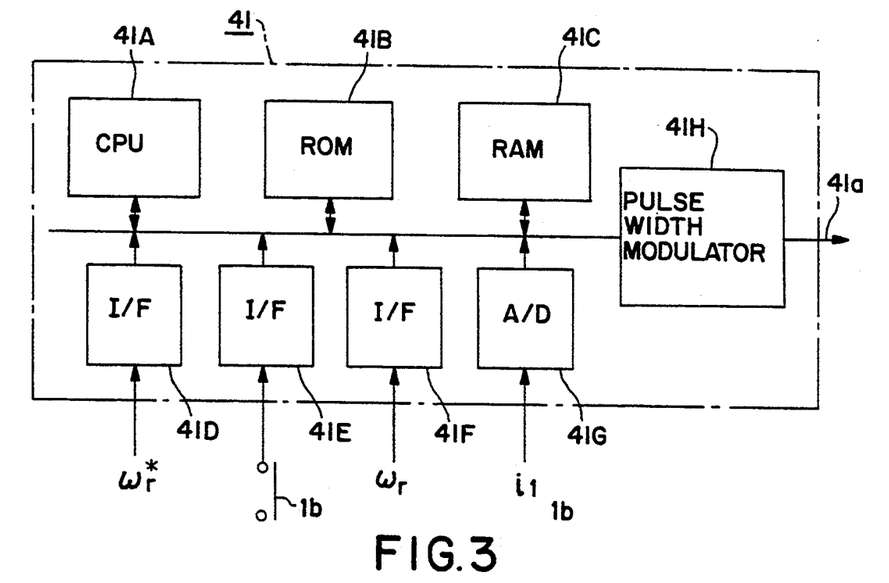
FIG. 3 is a block diagram showing the voltage/frequency control device of the control apparatus according to the present invention.

Referring now to FIGS. 1, 2, and 3, the speed control apparatus according to the present invention will be described below.

Turning to FIG. 2, a hoisting rope 11 is wound around a sheave 9 as well as a deflector wheel 9a. A cage 12 is coupled to one end of this hoisting rope 11, and a balance weight 13 is coupled to the other end. Disposed below them is a tension pulley 9b, around which a compensation rope 11a is wound with one end coupled to the cage 12 and the other end coupled to the weight 13. A brake 10 is disposed on the outer side of the shave 9.

Here, the sheave 9 is coupled to an induction motor 5. In order to drive the induction motor 5, the control apparatus comprises a power conversion device which includes a thyristor convertor 2 connected to a three-phase AC power source A.C., a capacitor 3 for smoothing the rectified voltage of the thyristor converter 2, and a transistor invertor 4 for inverting the smoothed direct current into alternating current and a voltage/-frequency control device (hereinbelow, simply termed "control device") 41 which controls the power conversion device by receiving the current signal of a current sensor 7 for detecting the current of the induction motor 5 and the velocity signal of a velocity sensor (tachometer generator) 6 for sensing the rotational velocity of the induction motor 5.

As depicted in FIG. 3, the control device 41 has a microprocessor (CPU) 41A, a read only memory (ROM) 41B, a random access memory (RAM) 41C, interface units (I/F) 41D, 41E, 41F, 41G, and an analog-to-digital converter (A/D) 41G. Interface units 41D–41G receive and store control command values in addition to the signals of the velocity sensor (tachometer generator) 6; and subject the power conversion device to pulse width modulation control on the basis of the stored data. The control command values are a velocity command $\omega_r^*$ which is input to the interface 41D, a velocity signal $\omega_r$ which is input to the interface 41F, and a primary current value $i_1$ which is input to an analog-to-digital converter 41G. Thus, the A.C. voltage of an approximate sinusoidal wave having a desired voltage value and frequency value is applied to the induction motor 5 through the pulse width modulator 41H and the transistor invertor 4.

With such control apparatus, when the ratio between the voltage and the frequency is maintained in a predetermined relationship, the output torque of the induction motor 5 can be kept constant. However, when it is intended to attain a control performance equivalent to that of a D.C. motor, vector and phase control of the induction motor 5 is required.

FIG. 1 shows an example of an arrangement of the control device which is called the "slip frequency type vector control system". Although the actual vector control is performed by the use of a microcomputer, the device is illustrated in block diagram form here in order to facilitate understanding of the principle.

In order to change primary current values to a rotating coordinate system, a control device 41 is provided which is composed of a three-phase-to-two-phase converter 42 having a rotational velocity which is the same as a secondary magnetic flux velocity. Control device 41 further includes a secondary magnetic flux arithmetical unit 43, adders 44, 46, 49, 54, 55, 57, 59; PI arithmetical units 45, 51, 56, 58, coefficient units 47, 52, 53, a divider 48, an integrator 50. For sending a three-phase voltage command value $V_1$ to the pulse width modulator 41H after changing coordinates from a rotating coordinate system to a three-phase fixed coordinate system, a two-phase-to-three-phase converter 60 is provided.

Now, the outline of the slip frequency vector control will be described with reference to FIG. 1.

The slip frequency vector control evaluates a magnetic flux component current $i_d$ and a torque component current $i_q$ as values in secondary magnetic flux coordinates $\Phi_2$. When the component currents $i_d$, and $i_q$ are changed into primary current values $i_1$ on fixed coordinates, they are changed without detecting a secondary magnetic flux vector.

In this case, a slip frequency which is determined by the magnetic flux component current is calculated using motor constants. This slip frequency and a rotational velocity are subsequently added to find the rotational velocity of the secondary magnetic flux. This rotational velocity is integrated to obtain a position, which is used in coordinate transformation as the estimated position of the secondary magnetic flux.

Thus, the control device 41 is supplied with a motor velocity signal as the state variable of the induction motor for addition with the slip frequency, but it is not supplied with any signal concerning the secondary magnetic flux. The magnetic flux control does not perform the feedback control, hence, a first-order lead is directly calculated and obtained from a secondary magnetic flux command so as to compensate for the first-order lag response of the secondary magnetic flux to the magnetic flux component current.

Accordingly, the slip frequency vector is a kind of predictive control which performs the control while estimating the magnetic flux vector by the calculations.

In FIG. 1, a primary current value $i_1$ which is output from the current sensor 7 is converted into magnetic flux component current $i_d$ and torque component current $i_q$ by the two-phase-to-three-phase converter 42. The magnetic flux component current $i_d$ is related to the secondary magnetic flux $\Phi_2$ according to the following equation:

$$\Phi_2 = \frac{M}{1 + (L_2/R_2)S} (i_d) \text{ (Here, } S \text{ denotes a Laplace operator.)}$$

(Here, S denotes a Laplace operator.) Therefore, the secondary magnetic flux $\Phi_2$ is calculated by the secondary magnetic flux arithmetical unit 43 based on the magnetic flux component current $i_d$. The secondary magnetic flux $\Phi_2$ is applied to the adder 44 with the secondary magnetic flux command $\Phi_2^*$ which is output from the velocity sensor 6 and the difference between the secondary magnetic flux $\Phi_2$ and the secondary magnetic flux command $\Phi_2^*$ is obtained by the adder 44. This difference is applied to the PI arithmetical unit 45, and the magnetic flux component current command value $i_d^*$ is obtained by the PI arithmetical unit 45. Then the magnetic flux component current command value $i_d^*$ is applied to the adder 46 with the magnetic flux component current $i_d$. After a difference between the magnetic flux component current command value $i_d^*$ and the magnetic flux component current $i_d$ is obtained by adder 46, the difference is applied to the PI arithmetical unit 51. A value which is obtained by the PI arithmetical unit 51 is added to an interaction voltage by adder 54, the interaction voltage being obtained by multiplying the torque component current $i_q$ by $K_2$ at the coefficient unit 53, thereby producing an output voltage component command value $V_d$* which is in phase with the magnetic flux component current $i_d$.

The difference between the velocity command value $\omega_r$* which is output from the velocity sensor 6 and the velocity $\omega_r$ is obtained by adder 55 and that difference is applied to PI unit 56 thus generating torque component current command value $i_q$*. The difference between the torque component current command value $i_q$* and the torque component current $i_q$ is obtained by the adder 57 and applied to PI arithmetical unit 58. A value which is obtained by the PI arithmetical unit 58 is added to an interaction voltage by the adder 59, the interaction voltage being obtained by multiplying the magnetic flux component current $i_d$ by $K_1$ at the coefficient unit 52, thereby producing an output voltage component command value $V_q$* which is in phase with the torque component $i_q$.

The torque component current $i_q$ is multiplied by $R_2$ at the coefficient unit 47 and is divided by the secondary magnetic flux $\Phi_2$ at the divider 48 to obtain a slip frequency command value $\omega_s$*. The adder 49 sums the slip frequency command value $\omega_s$* and the velocity $\omega_r$ to obtain an output frequency. The output frequency is integrated by the integrator 50 to obtain an output phase $\Theta$. The two-phase-to-three-phase converter 60 receives as inputs: the output phase, the output voltage component command value $V_d$ which is in phase with the magnetic flux component current $i_d$, and the output voltage component command value $V_q$* which is in phase with the torque component current $i_q$ and converts the inputs into a three-phase voltage command value $V_1$. The two-phase-to-three-phase converter 60 applies a three-phase voltage command value $V_1$ to the pulse width modulator 41H after changing the coordinate system from a rotating coordinate system to a three-phase fixed coordinate system.

Figure 4:
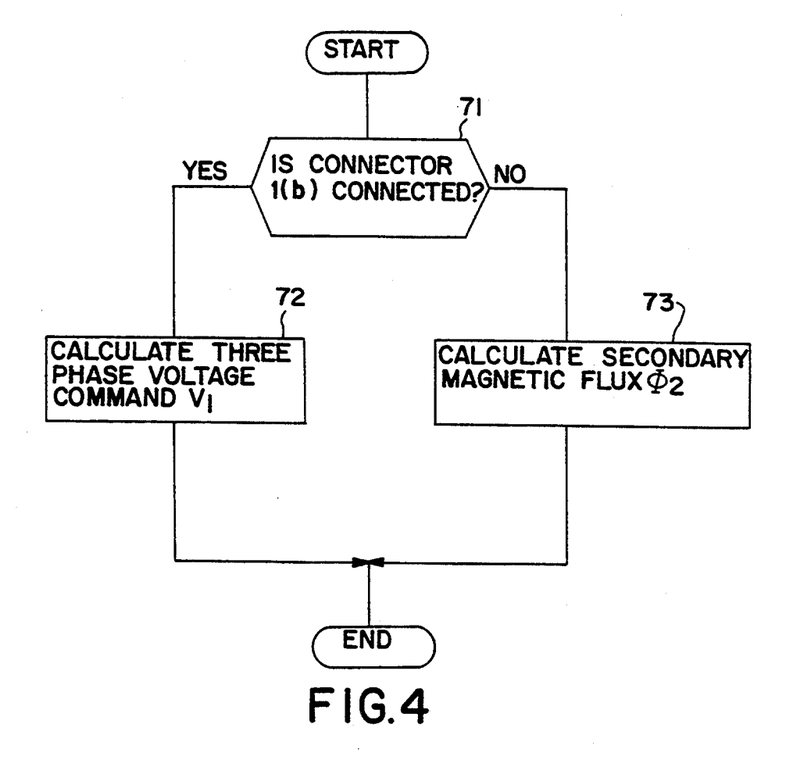
FIG. 4 is a flow chart for explaining the operation, of this embodiment.

Arithmetical time sequence of the control device 41 is described in FIG. 4.

At step 71 it is judged whether the connector 1b is connected or not. If the connector is connected, the three-phase voltage command value $V_1$ is calculated, to apply to the pulse width modulator 41H. If the connector 1b is not connected, the secondary magnetic flux $\Phi_2$ is calculated by the secondary magnetic flux arithmetical unit 43 at step 73, then when the connector 1b is connected, the secondary magnetic flux $\Phi_2$ is applied for calculation of the magnetic flux component current command value $i_d$* as an initial-value of the secondary magnetic flux $\Phi_2$.

Figure 5A:
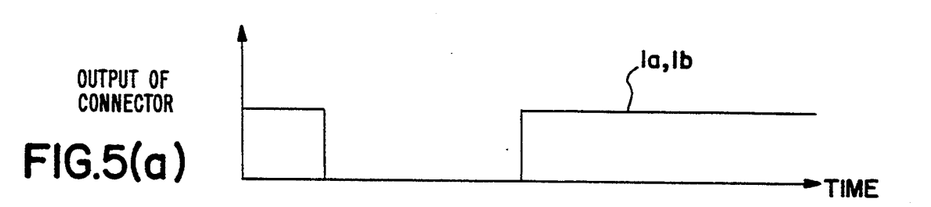
FIG. 5a is a graph of the output of connectors 1a and 1b over time, where connectors 1a and 1b have a first opening time.
Figure 5B:
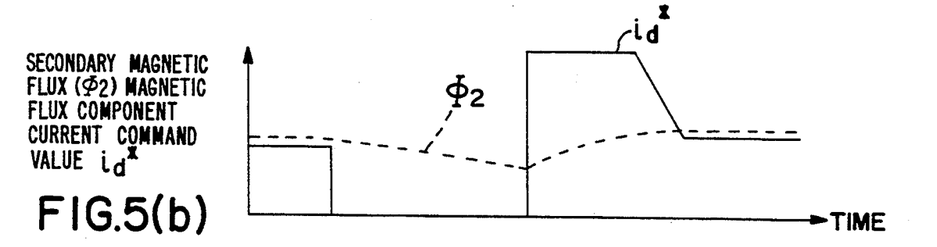
FIG. 5(b) is a graph of a magnetic flux component current command change over time where the opening time corresponds to FIG. 5(a).
Figure 5C:
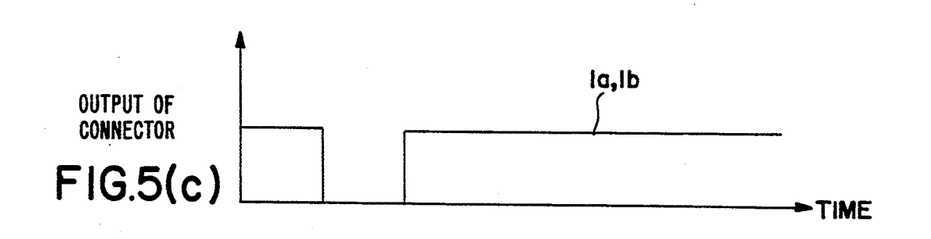
FIG. 5(c) is a graph of the output of connectors 1a and 1b over time where connectors 1a and 1b have a second opening time which is shorter than the first opening time.
Figure 5D:
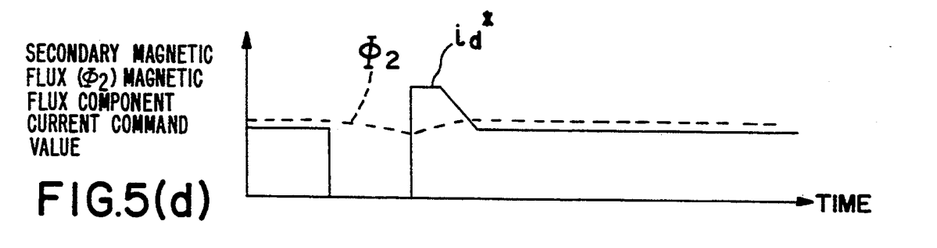
FIG. 5(d) is a graph of a magnetic flux component current command change over time where the opening times correspond to those in FIG. 5(c).

FIGS. 5(a)–5(d) show the relationship between the opening time of the connector 1b and the magnetic component current command value $i_d$*. FIG. 5(a) shows a case of long opening time and FIG. 5(b) illustrates the response of the magnetic component current command value $i_d$*. FIG. 5(c) shows a case of short opening time and FIG. 5(d) depicts the response of the magnetic current command value $i_d$*.

The secondary magnetic flux $\Phi_2$ is calculated when the connector 1b is opened. If the opening time is long, a value of the secondary magnetic flux $\Phi_2$ is large, if the opening time is short, a value of the secondary magnetic flux $\Phi_2$ is small. The magnetic control loop which consists of the secondary magnetic flux arithmetical unit 43, the adder 44, and PI arithmetical unit 45 corporate to generate the magnetic flux component current command value $i_d$*. Therefore, this speed control apparatus does not generate sudden and abrupt movements upon elevator restarting.

I claim:

1. A control apparatus for an elevator comprising:
   (a) a conversion device for converting alternating current to direct current;
   (b) an AC power source which communicates with said conversion device via a contactor and supplies an alternating current to said conversion device;
   (c) an elevator driving motor driven by an output of said conversion device;
   (d) a three-phase to two-phase converter connected to said conversion device, said three-phase to two-phase converter generating first and second current components $i_d$ and $i_q$;
   (e) a first arithmetical means for calculating a secondary magnetic flux $\Phi_2$ of said motor based on the first current component $i_d$ when the contactor is opened and for outputting the value of the secondary magnetic flux $\Phi_2$ as an initial-value of the secondary magnetic flux when the contactor is closed;
   (f) a second arithmetical means for generating a first current component command value $i_d$* based on the initial-value of the secondary magnetic flux;
   (g) a first subtracter for calculating a difference between the first current component command value $i_d$* and the first current component $i_d$;
   (h) a first coefficient unit for multiplying the second current component $i_q$ by a constant $K_2$ to produce a first interaction voltage;
   (i) a third arithmetical means for producing a first output voltage component command value $V_d$* that is in phase with the first current component $i_d$ responsive to the first current component command value $i_d$* based on the difference calculated by said first subtracter and the first interaction voltage;
   (j) a fourth arithmetical means for calculating a second current component command value $i_q$*;
   (k) a second subtracter for calculating a difference between the second current component command value $i_q$* and the second current component $i_q$;
   (l) a second coefficient unit for multiplying the first current component $i_d$ by a constant $K_1$ to produce a second interaction voltage;
   (m) a fifth arithmetical means for producing a second output voltage component command value $V_q$* that is in phase with the second current component $i_q$ responsive to the second current component command value $i_q$* based on the difference calculated by said second subtracter and the second interaction voltage;
   (n) a two-phase to three-phase converter for converting the first and second output voltage component command values $V_d$* and $V_q$* into a three-phase voltage; and
   (o) a control device responsive to the threephase voltage output of said two-phase to three-phase converter and thereby controlling the speed of the elevator.

2. A control apparatus according to claim 1 wherein said conversion device includes a thyristor, a capacitor and an inventor.

3. A control apparatus according to claim 1 wherein said control device includes a pulse width modulator.

4. A control apparatus according to claim 1, further comprising a current sensor which detects a primary current value of an output of said conversion device.

5. A control apparatus according to claim 1 further comprising a velocity sensor which detects a velocity, a velocity command value and a secondary magnetic flux command value of said elevator driving motor.

6. A control apparatus according to claim 1 wherein said third arithmetical means includes a PI arithmetical unit having an output and an adder connected to the output of the PI arithmetical unit.

* * * * *

UNITED STATES PATENT AND TRADEMARK OFFICE
CERTIFICATE OF CORRECTION

PATENT NO. :   5,414,333
DATED      :   May 9, 1995
INVENTOR(S) :  Toru Tanahashi It is certified that error appears in the above-indentified patent and that said Letters Patent is hereby corrected as shown below:

Column 6, Line 60, change "threephase" to --three-phase--;

Line 66, change "inventor" to --inverter--.

Signed and Sealed this

Twenty-fifth Day of July, 1995

*Attest:*

BRUCE LEHMAN

*Attesting Officer*   *Commissioner of Patents and Trademarks*